US012618428B2

(12) United States Patent
    Deshpande

(10) Patent No.: US 12,618,428 B2
(45) Date of Patent: May 5, 2026

(54) DEVICE AND METHOD OF USE FOR MAGNETIC PANEL JOINT

(71) Applicant: Neil Deshpande, Atlanta, GA (US)

(72) Inventor: Neil Deshpande, Atlanta, GA (US)

( * ) Notice: Subject to any disclaimer, the term of this patent is extended or adjusted under 35 U.S.C. 154(b) by 245 days.

(21) Appl. No.: 18/235,495

(22) Filed: Aug. 18, 2023

(65) Prior Publication Data

US 2024/0133408 A1    Apr. 25, 2024
US 2024/0229845 A9    Jul. 11, 2024

Related U.S. Application Data

(60) Provisional application No. 63/418,471, filed on Oct. 21, 2022.

(51) Int. Cl.
    *F16B 12/28*      (2006.01)
    *A47B 47/00*      (2006.01)
(52) U.S. Cl.
    CPC .......... *F16B 12/28* (2013.01); *A47B 47/0066* (2013.01); *A47B 47/0075* (2013.01); *A47B 47/0091* (2013.01); *F16B 2200/83* (2023.08)
(58) Field of Classification Search
    None
    See application file for complete search history.

(56) References Cited

U.S. PATENT DOCUMENTS

| | | | |
|---|---|---|---|
| 10,273,999 B2 * | 4/2019 | Chang ..................... | F16B 12/14 |
| 11,825,948 B1 * | 11/2023 | Stuckenschneider ....................... A47B 96/201 | |
| 2019/0107134 A1 * | 4/2019 | Di Quadri ............... | F16B 12/28 |
| 2020/0158152 A1 * | 5/2020 | Chorny ................... | F16B 12/10 |
| 2020/0205586 A1 * | 7/2020 | Arradondo ........... | A47F 5/0006 |
| 2022/0061554 A1 * | 3/2022 | Antillon ................... | F16B 1/00 |
| 2023/0355010 A1 * | 11/2023 | Kneeskern .............. | A47F 3/005 |

* cited by examiner

*Primary Examiner* — Daniel J Wiley
(74) *Attorney, Agent, or Firm* — Finnegan, Henderson, Farabow, Garrett & Dunner LLP

(57) ABSTRACT

Disclosed herein are systems for a magnetic panel joint and magnetically joined, paneled storage units. The magnetic panel joint comprises a first magnetic panel including an angled protrusion defining a first receptacle, a second magnetic panel including a groove body defining a groove and a second receptacle, and a magnetic fastener. The angled protrusion can be removably inserted into the groove to enable alignment of the first receptacle and the second receptacle, and the magnetic fastener can be removably inserted into the aligned receptacles to enable secure coupling of the first magnetic panel and the second magnetic panel. The second magnetic panel may include a slot body defining a slot and a receptacle. An angled protrusion of a third panel can be removably inserted into the slot. Each individual panel may be a horizontal shelf, a vertical wall, or a rear wall or a storage unit.

17 Claims, 25 Drawing Sheets

700

Insert protrusion of first panel into groove or slot of second magnetic panel — 710

Align receptacle of first panel with receptacle of second magnetic panel — 720

Insert magnetic fastener into receptacle of first panel and receptacle of second magnetic panel — 730

DEVICE AND METHOD OF USE FOR MAGNETIC PANEL JOINT

TECHNICAL FIELD

The present disclosure generally relates to joinery and, more particularly, magnetic panel joints. Magnetic panel joints enable quick assembly of magnetic panels for use in a variety of fields including shelving, cabinetry, and storage solutions. Furthermore, magnetic panel joints allow paneled structures to be easily expanded vertically or horizontally. The disclosed invention also enables a secure and aesthetically pleasing joint.

BACKGROUND

The present disclosure relates in general to a magnetic panel joint, and more specifically, to removably connected magnetic panels.

It is known in the prior art that there are paneled structures for use in shelving, cabinetry, and storage solutions. These paneled structures differ in construction and assembly methods. Many paneled structures have multiple panels joined by hardware such as brackets, pins, rods, screws, and bolts. Consumers must assemble these paneled structures using tools. These paneled structures are also difficult to disassemble. Many paneled structures, once assembled, are insecure and unsafe.

The present disclosure differs from the above referenced disclosures and others that are similar in that the present disclosure allows for faster, tool-free, assembly and disassembly, and enables a secure and safe paneled structure.

SUMMARY

Embodiments of the disclosure provide a magnetic panel joint and magnetically joined, paneled storage units. The magnetic panel joint comprises a first magnetic panel including an angled protrusion defining a first receptacle, a second magnetic panel including a groove body defining a groove and a second receptacle, and a magnetic fastener. The angled protrusion can be removably inserted into the groove to enable alignment of the first receptacle and the second receptacle, and the magnetic fastener can be removably inserted into the aligned receptacles to enable secure coupling of the first magnetic panel and the second magnetic panel.

According to some embodiments, the second magnetic panel may include a slot body defining a slot and a receptacle. An angled protrusion of a third panel can be removably inserted into the slot. Each individual panel may be a horizontal shelf, a vertical wall, or a rear wall or a storage unit.

It is to be understood that both the foregoing general description and the following detailed description are exemplary and explanatory only and are not restrictive of the disclosed embodiments.

BRIEF DESCRIPTION OF THE FIGURES

The accompanying drawings, which are incorporated in and constitute a part of this specification, illustrate several embodiments and, together with the description, serve to explain the disclosed principles. In the drawings.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims. The terms and definitions provided herein control, if in conflict with terms or definitions incorporated by reference.

The present invention relates to magnetic panel joints including for example, magnetic shelf panel joints comprising a magnetic panel including a protrusion, a magnetic panel defining a groove or slot, and a magnetic fastener.

Figure 1B:
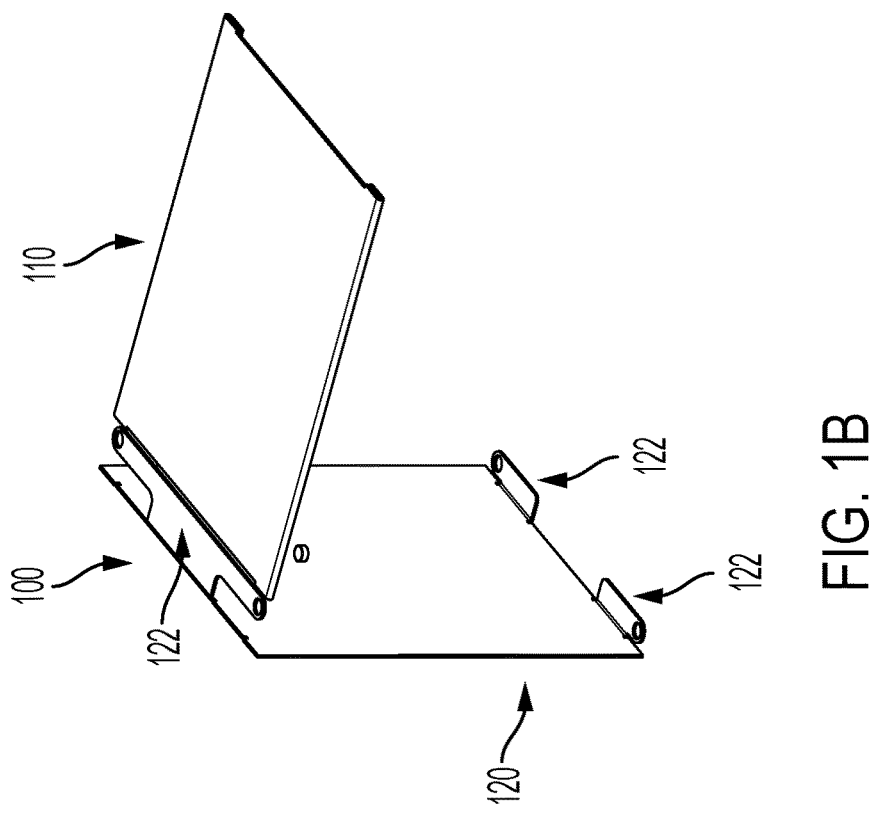
FIG. 1B is an exploded view of a magnetic panel joint displaying a vertical side wall and a horizontal shelf.
Figure 1A:
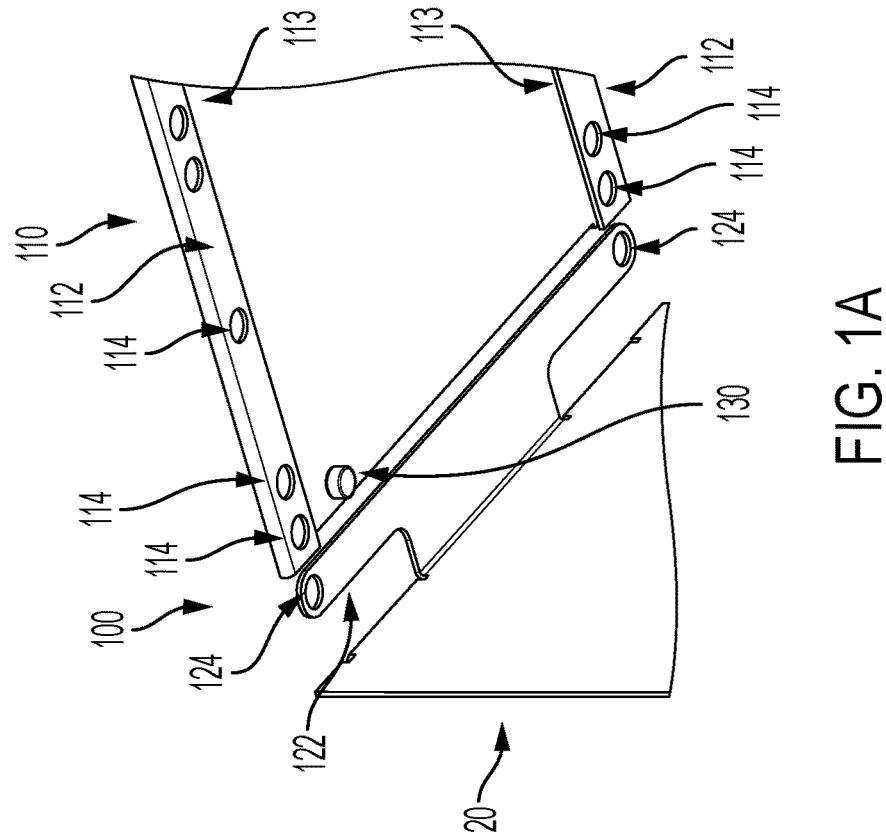
FIG. 1A is an exploded view of a magnetic panel joint in accordance with some embodiments of the present disclosure.

An unassembled magnetic shelf panel joint 100 is generally shown in FIGS. 1A and 1B. As shown in the embodiment in FIGS. 1A and 1B, each magnetic shelf panel joint 100 can include a vertical side shelf wall panel 120, a horizontal shelf panel 110, and a magnetic fastener 130. Vertical side shelf wall panel 120 may include one or more angled protrusions 122 defining one or more internal receptacles 124. Horizontal shelf panel 110 may include one or more groove bodies 112 defining one or more grooves 113 and external receptacles 114. In the embodiment shown in FIGS. 1A and 1B, angled protrusion 122 can be inserted into groove 113. After insertion, internal receptacle 124 can be aligned with external receptacle 114, and magnetic fastener 130 can be inserted into both internal receptacle 124 and external receptacle 114.

Figure 2B:
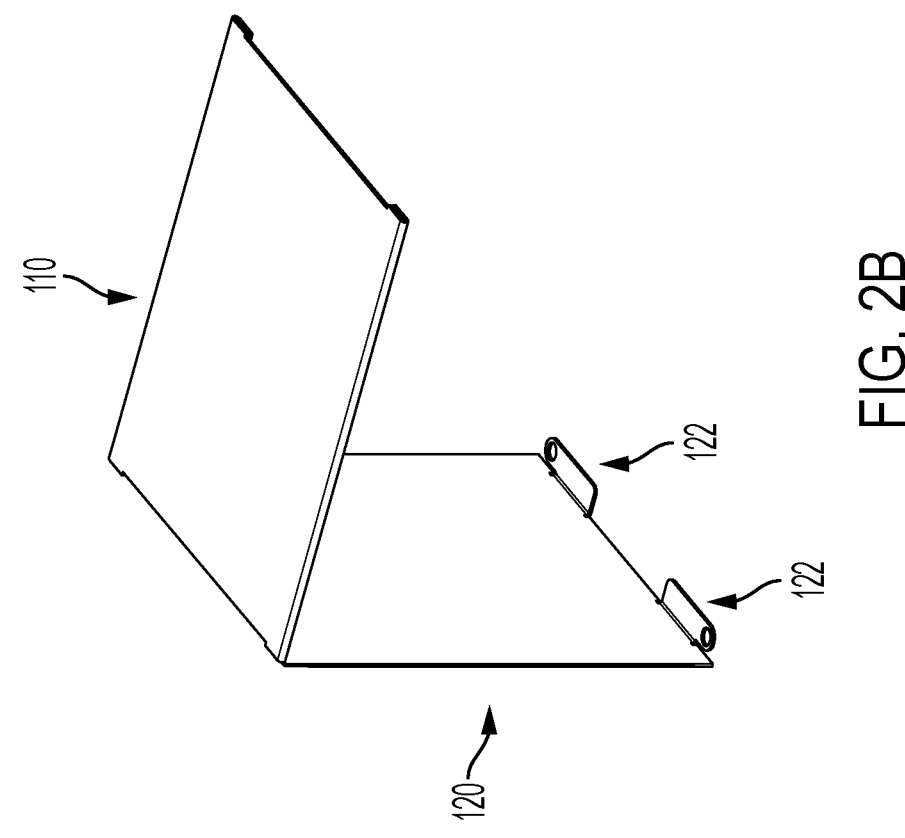
FIG. 2B is a perspective view of an assembled magnetic panel joint displaying a vertical side wall panel and a horizontal shelf panel.
Figure 2A:
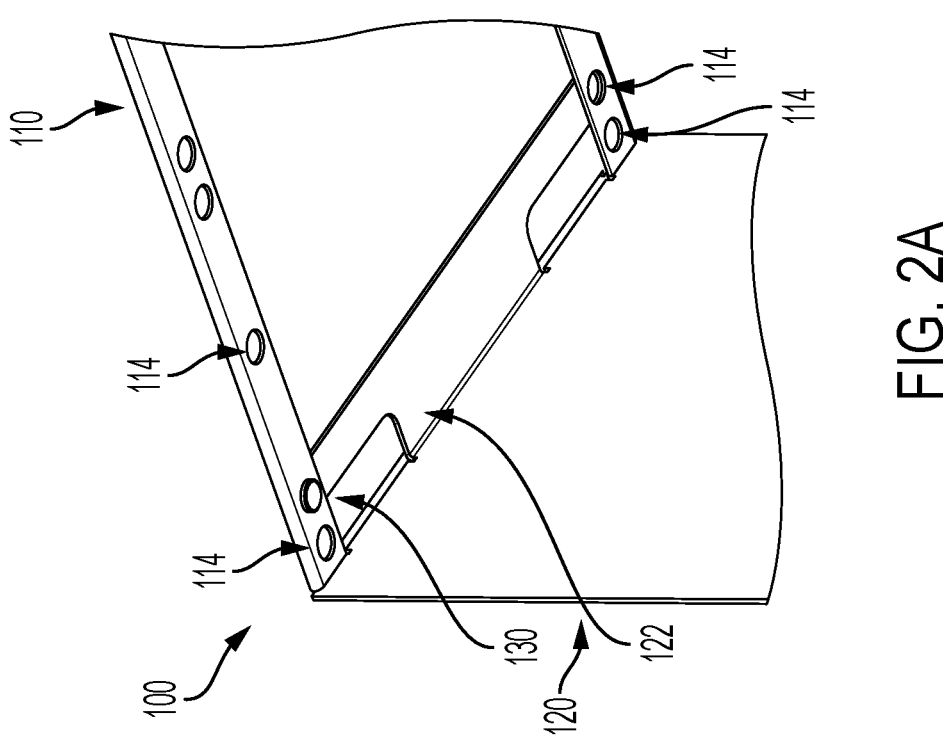
FIG. 2A is a perspective view of an assembled magnetic panel joint in accordance with some embodiments of the present disclosure.

An assembled magnetic shelf panel joint 100 is generally shown in FIGS. 2A and 2B. As shown in the embodiment in FIGS. 2A and 2B, after angled protrusion 122 is inserted into groove 113 and internal receptacle 124 is aligned with external receptacle 114, magnetic fastener 130 is inserted into external receptacle 114 and internal receptacle 124. Magnetic fastener 130 magnetically secures vertical side shelf wall panel 120 and horizontal shelf panel 110. Magnetic shelf panel joint 100 may, among other things, be used to joint shelf panels of a variety of storage solutions.

Figures 3A, 3B:
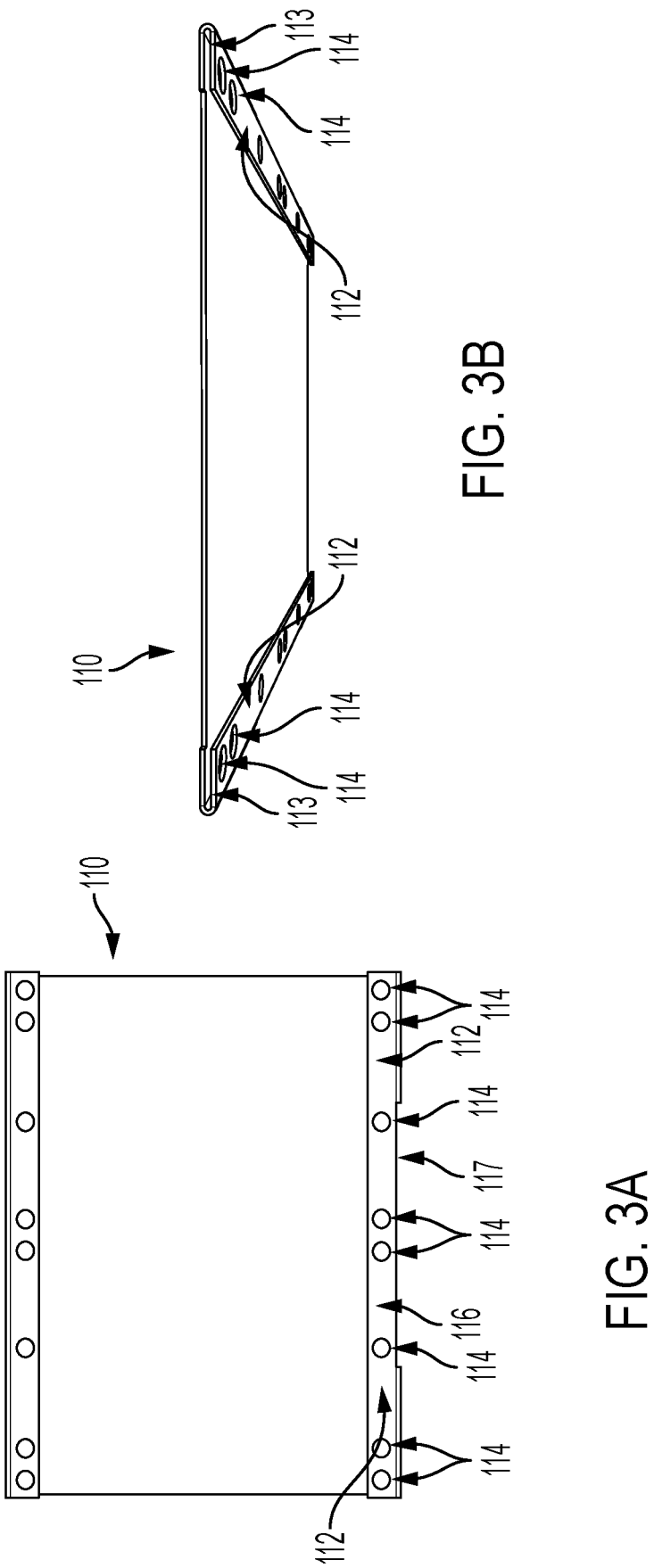
FIG. 3A is a bottom view of a horizontal shelf panel displaying external receptacles, a slot body, and a slot.
FIG. 3B is a perspective view of a horizontal shelf panel displaying external receptacles, a groove body, and groove.
Figure 4:
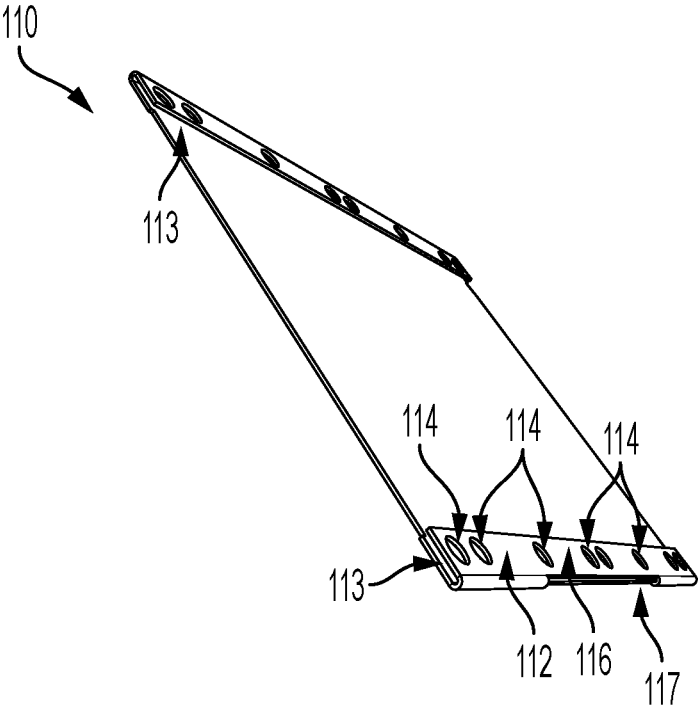
FIG. 4 is a is a perspective view of a horizontal shelf panel in accordance with some embodiments of the present disclosure.

As shown in greater detail in FIGS. 3A, 3B, and 4, horizontal shelf panel 110 may include multiple groove bodies 112 defining multiple groves 113 and external receptacles 114. Each groove is capable of receiving multiple protrusions and each external receptacle is capable of receiving a magnetic fastener. Horizontal shelf panel 110 may also include one or more slot bodies 116 defining one or more slots 117 and external receptacles 114. Each slot is capable of receiving multiple protrusions and each external receptacle is capable of receiving a magnetic fastener. Horizontal shelf panel 110 may enable magnetic shelf panel joints 100 multiple sides, thereby securing multiple vertical side shelf wall panels 120. In some embodiments, horizontal shelf panel 110 may be comprised of steel or any other rigid, magnetic material.

Figure 5:
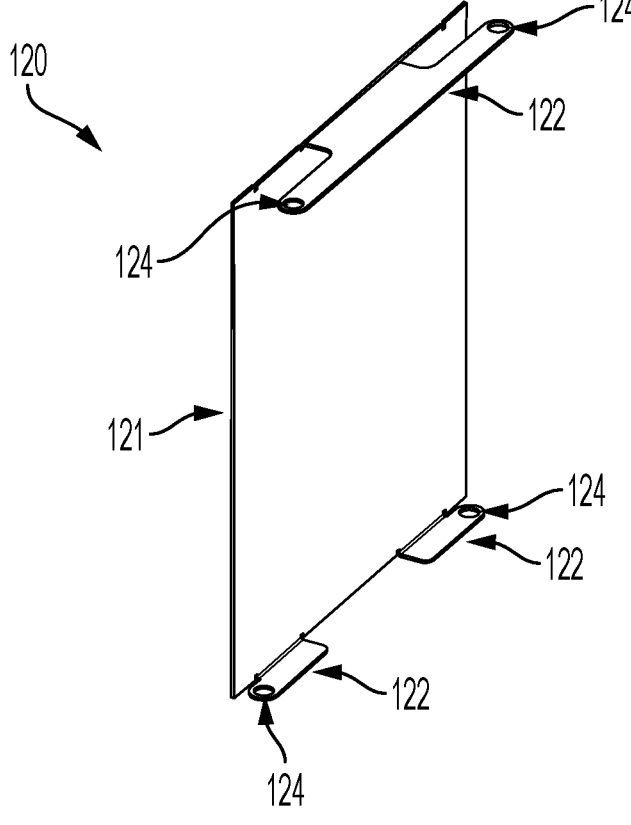
FIG. 5 is a perspective view of an external vertical shelf wall in accordance with some embodiments of the present disclosure.

As shown in greater detail in FIG. 5, vertical side shelf wall 120 comprises multiple angled protrusions 122 on one side of a shelf wall 121. Accordingly, vertical side shelf wall 120 may be used on the exterior of a shelving unit. Vertical side shelf wall 120 may enable multiple magnetic shelf panel joints 100. For example, a horizontal shelf panel 110 could be connected to an upper protrusion and a lower protrusion. In some embodiments, vertical side shelf 120 can be comprised of steel, aluminum, polyvinyl chloride, polyethylene, other plastics, or other hard materials.

Figures 6A, 6B:
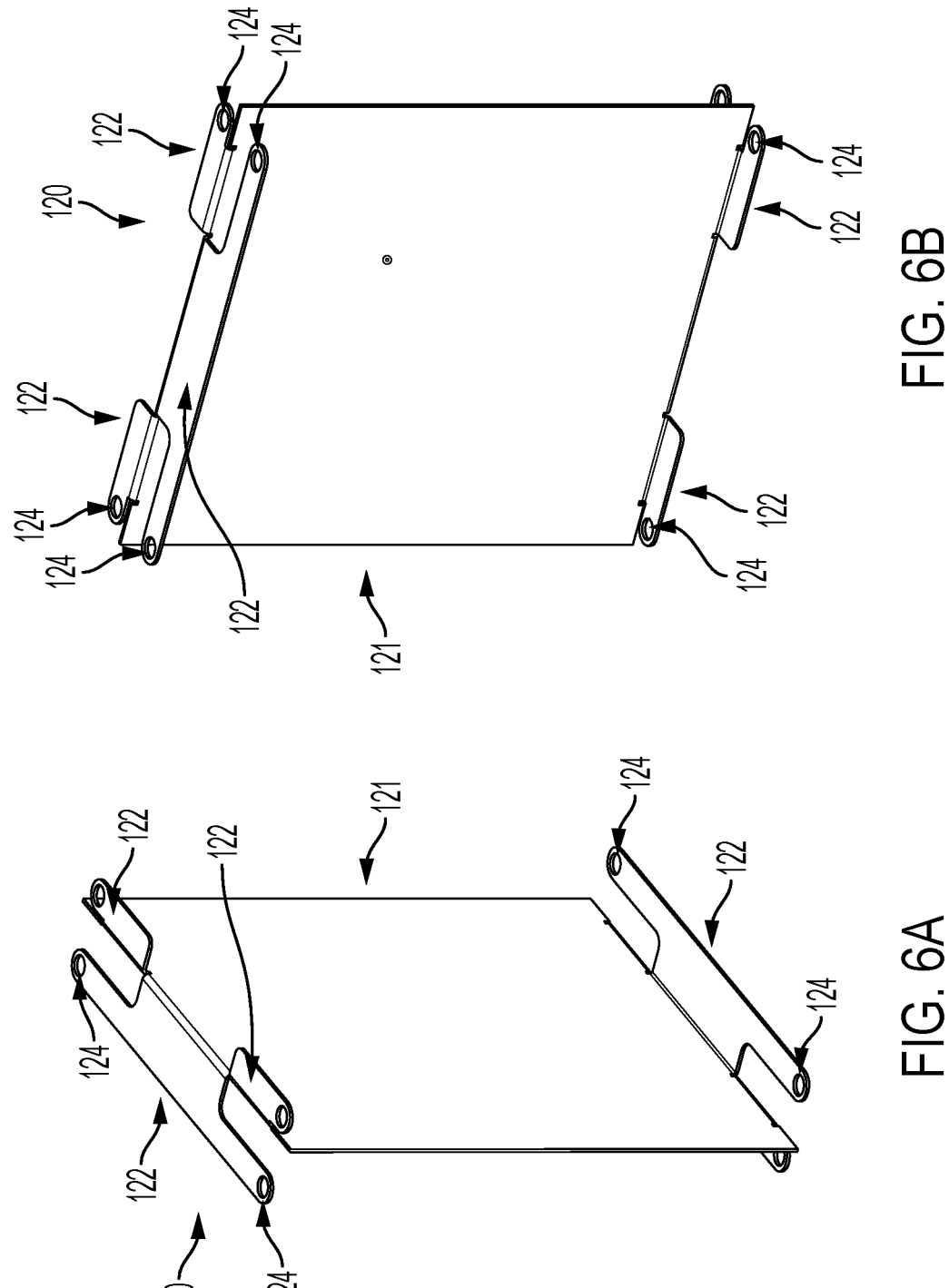
FIG. 6A is a perspective view of an internal vertical shelf wall in accordance with some embodiments of the present disclosure.
FIG. 6B is a is a perspective view of an internal vertical shelf wall in accordance with some embodiments of the present disclosure.

FIG. 6 illustrates an alternative embodiment of vertical side shelf wall panel 120 that comprises multiple protrusions on both sides of a shelf wall 121. Accordingly, vertical side shelf wall 120 may be used on the interior of a shelving unit. Vertical side shelf wall 120 may enable multiple magnetic shelf panel joints 100 on both sides of shelf wall 121. For example, a horizontal shelf panel 110 could be connected to upper and lower protrusions on both sides of shelf wall 121.

Figures 7A, 7B:
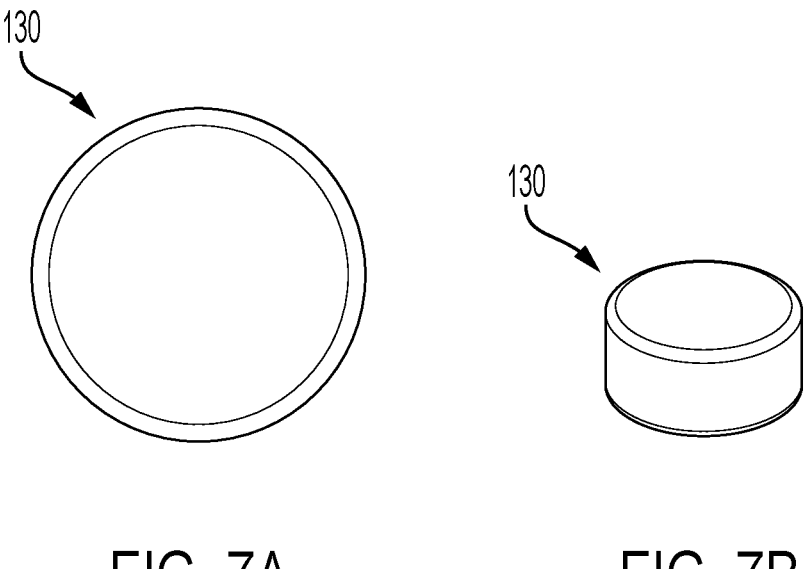
FIG. 7A is a top view of a magnetic fastener in accordance with some embodiments of the present disclosure.
FIG. 7B is a perspective view of a magnetic fastener in accordance with some embodiments of the present disclosure.
Figures 8A, 8B:
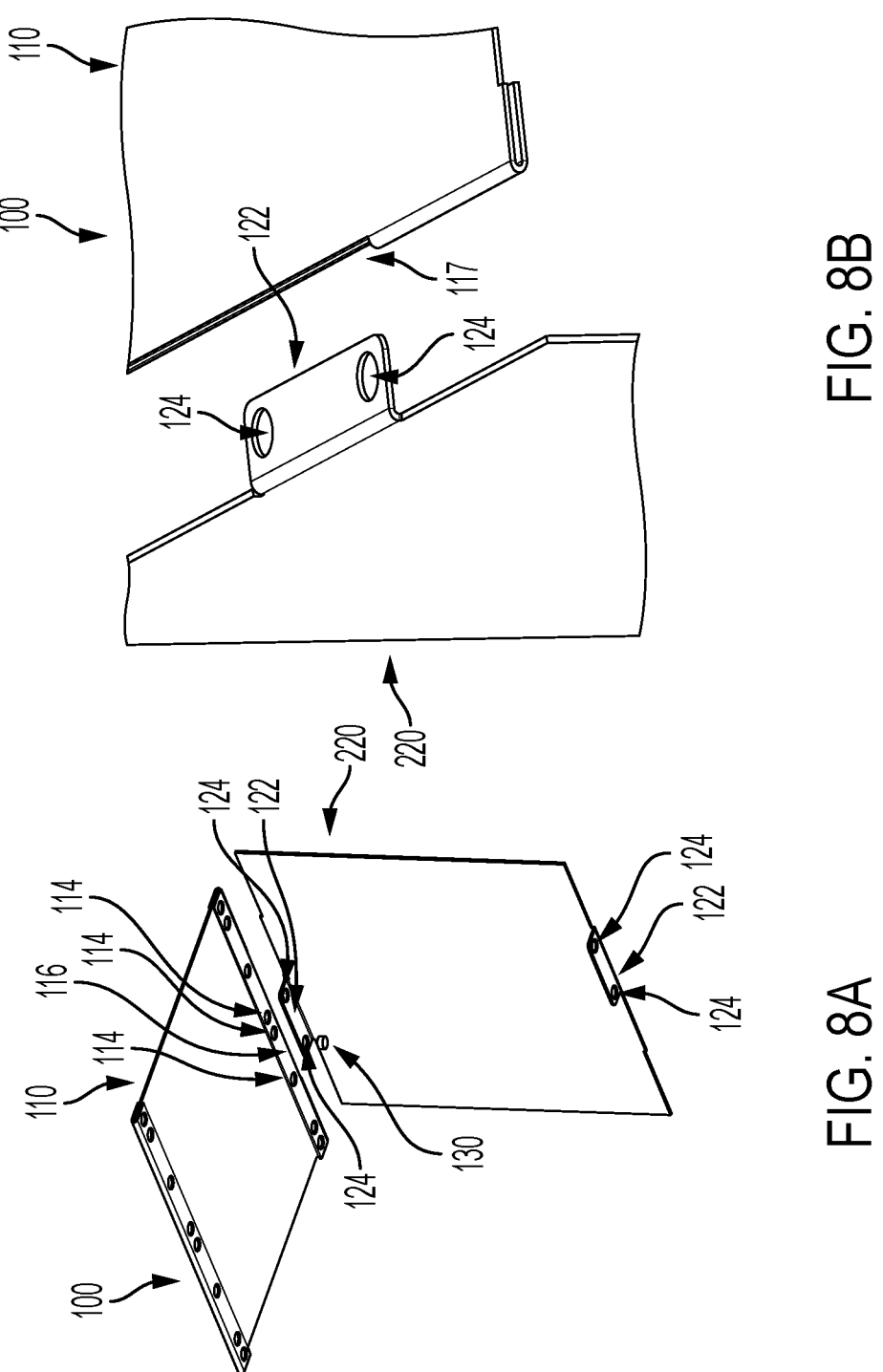
FIG. 8A is an exploded view of a magnetic panel joint displaying a vertical rear wall and a horizontal shelf.
FIG. 8B is an exploded view of a magnetic panel joint in accordance with some embodiments of the present disclosure.

A magnetic fastener 130 is generally shown in FIGS. 7A and 7B. Magnetic fastener 130 is sized to fit inside internal receptacle 124 and external receptacle 114. In some embodiments, magnetic fastener 130 can be comprised of a neodymium magnet, a alnico magnet, a ceramic magnet, a samarium-cobalt magnet, or any other type of magnet. In alternative embodiments, the magnetic fastener may have additional textures, protrusions, or geometry to facilitate easy insertion and removal.

FIGS. 8A, 8B, 9A, and 9B illustrate an alternative embodiment of magnetic shelf panel joint 100. As shown in the embodiment in FIGS. 8A and 8B, each magnetic shelf panel joint 100 can include a vertical rear shelf wall panel 220, a horizontal shelf panel 110, and a magnetic fastener 130. Vertical rear shelf wall panel 220 may include one or more angled protrusions 122 defining one or more internal receptacles 124. Horizontal shelf panel 110 may include one or more slot bodies 116 defining one or more slots 117 and external receptacles 114. In the embodiment shown in FIGS. 8A and 8B, angled protrusion 122 can be inserted into slot 117. After insertion, internal receptacle 124 can be aligned with external receptacle 114, and magnetic fastener 130 can be inserted into both internal receptacle 124 and external receptacle 114.

Figure 9B:
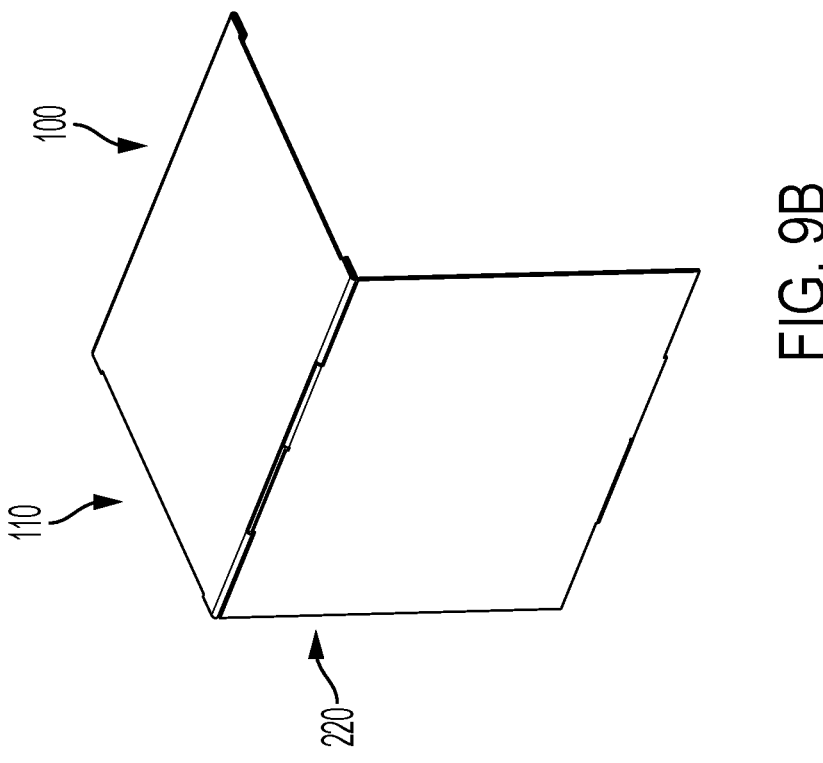
FIG. 9B is a perspective view of an assembled magnetic panel joint displaying a vertical rear wall panel and a horizontal shelf panel.
Figure 9A:
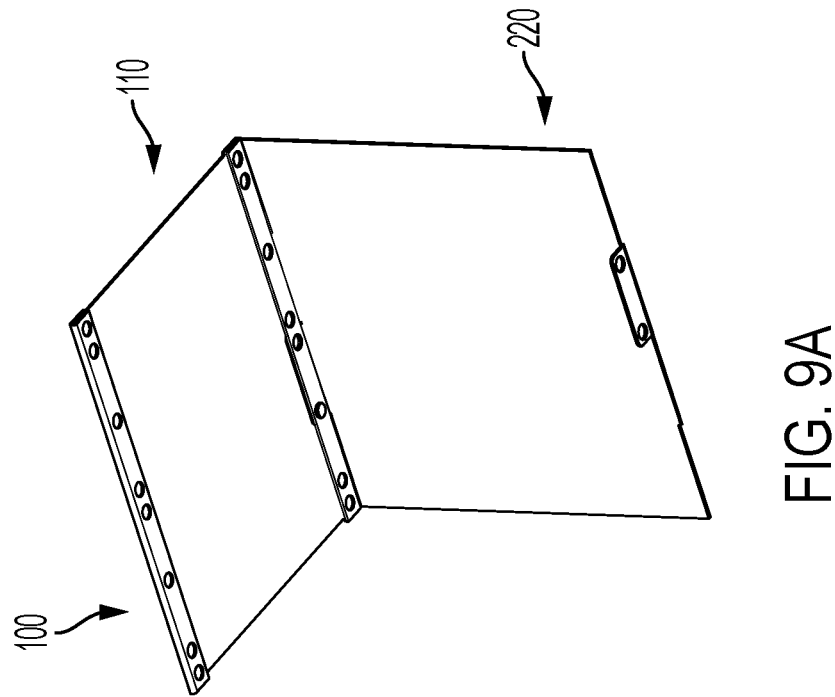
FIG. 9A is a perspective view of an assembled magnetic panel joint in accordance with some embodiments of the present disclosure.

An assembled magnetic shelf panel joint 100 is generally shown in FIGS. 9A and 9B. As shown in the embodiment in FIGS. 9A and 9B, after angled protrusion 122 is inserted into slot 117 and internal receptacle 124 is aligned with external receptacle 114, magnetic fastener 130 is inserted into external receptacle 114 and internal receptacle 124. Magnetic fastener 130 magnetically secures vertical rear shelf wall panel 220 and horizontal shelf panel 110. Magnetic shelf panel joint 100 may, among other things, be used to joint shelf panels of a variety of storage solutions. Vertical rear shelf wall panel 220 may provide stability to shelving units.

Figure 10:
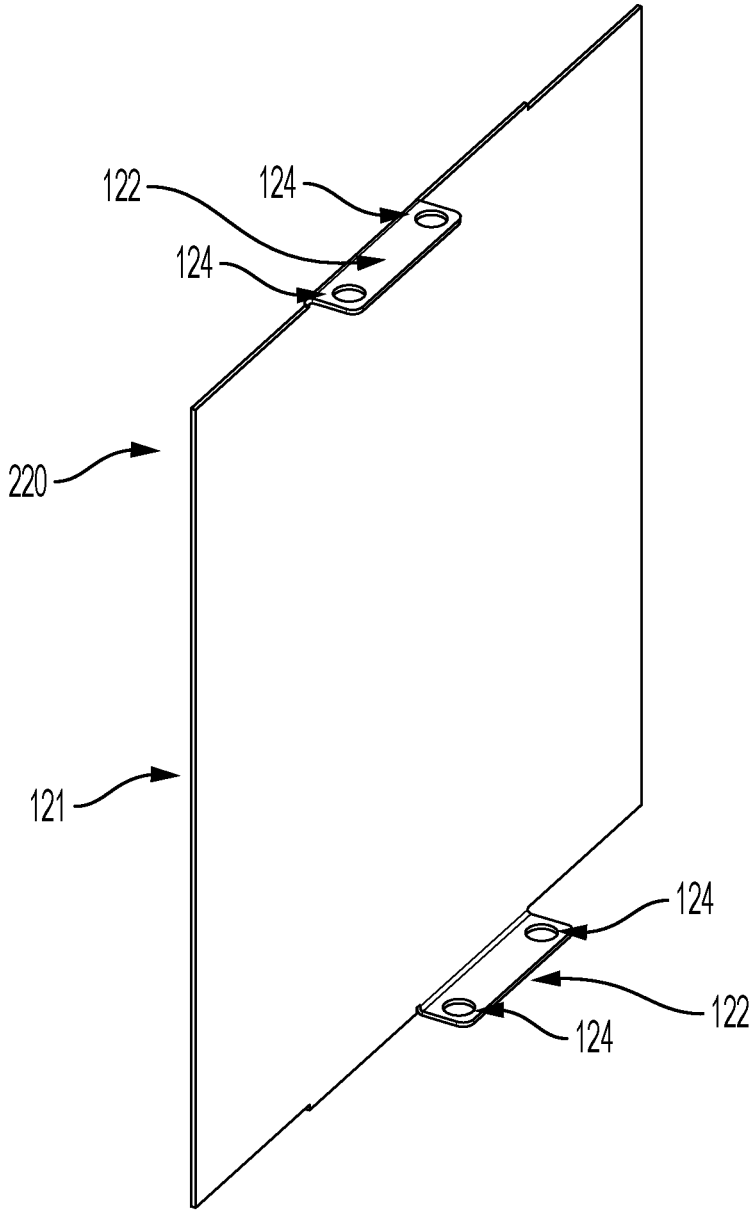
FIG. 10 is a perspective view of a rear wall panel.

As shown in greater detail in FIG. 10, vertical rear shelf wall 220 comprises multiple angled protrusions 122 on one side of a shelf wall 121. Accordingly, vertical rear shelf wall 220 may be used on the exterior of a shelving unit or other storage solution. In some embodiments, vertical side shelf 120 can be comprised of steel, aluminum, polyvinyl chloride, polyethylene, other plastics, or other hard materials.

Figure 11:
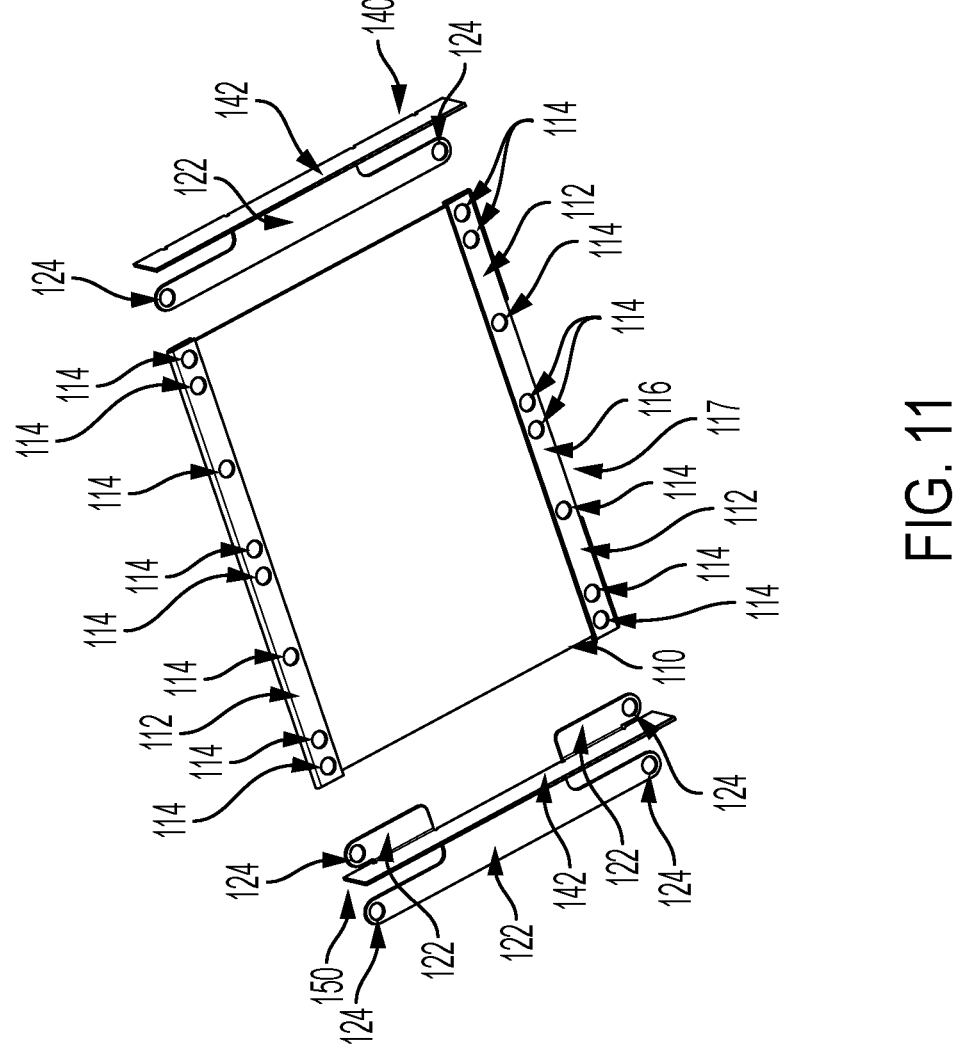
FIG. 11 is an exploded view of a shelf assembly displaying a foot component and a tee component.

FIG. 11 illustrates a horizontal shelf 110 prior to assembly with a foot component 140 and a tee component 150. Foot component 140 includes an angled protrusion 122 defining one or more internal receptacles 124 and a foot 142. Tee component 150 includes one or more angled protrusions on both sides of a foot 142. In the embodiment shown in FIG. 11, angled protrusions 122 can be inserted into grooves 113. After insertion, internal receptacles 124 can be aligned with external receptacles 114, and magnetic fasteners 130 can be inserted into both internal receptacle 124 and external receptacle 114. Feet 142 may point downward and contact a flooring surface and serve as the foundation of a shelving unit or storage solution. Alternatively, feet may point upward at the top of a shelving unit or storage solution and serve as dividers or outer barriers to enable storage on top of a shelving unit or storage solution.

Figures 12A, 12B:
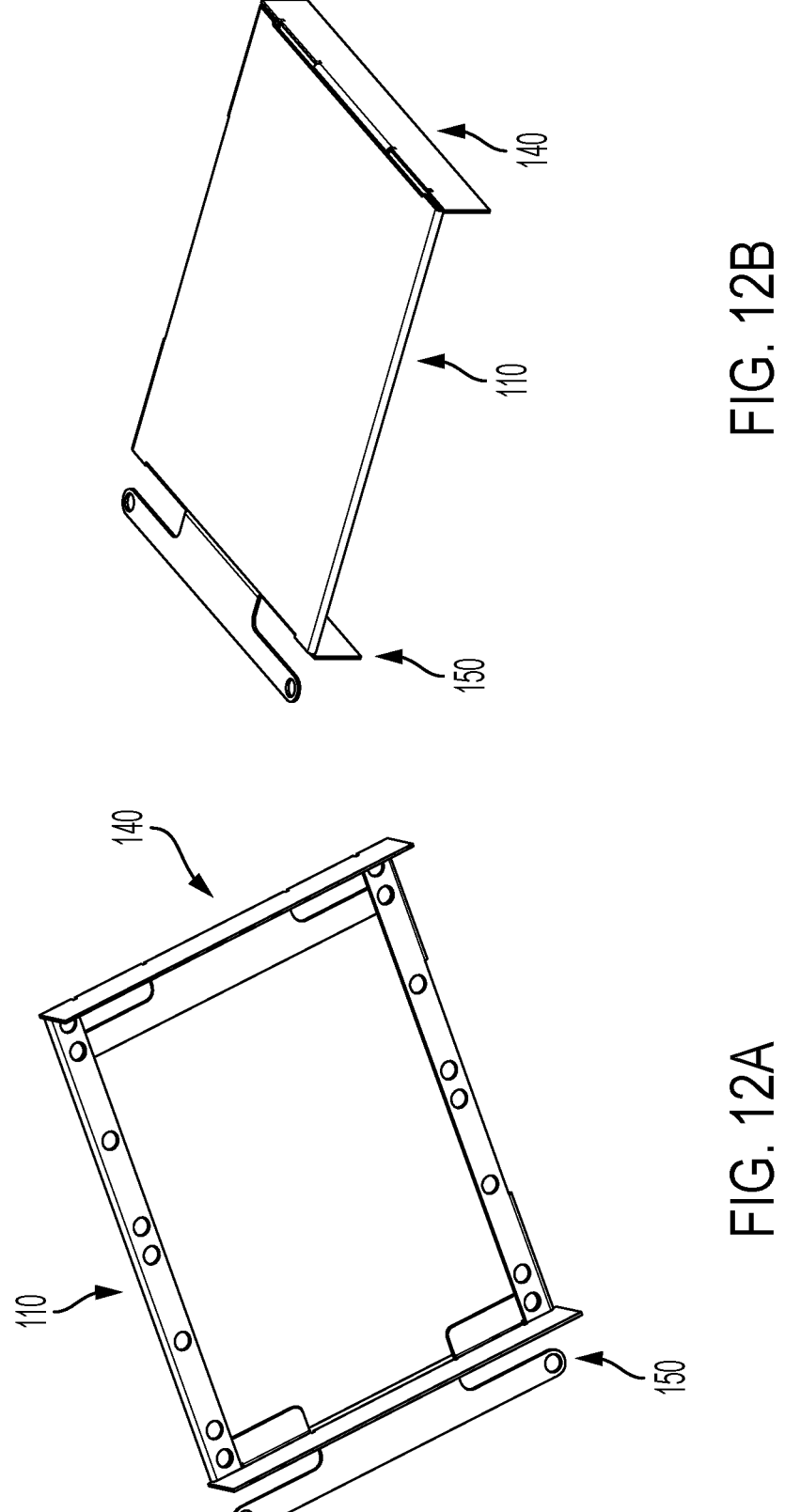
FIG. 12A is a perspective view of a shelf assembly displaying a foot component and a tee component.
FIG. 12B is a perspective view of a shelf assembly displaying a foot component and a tee component.

FIGS. 12A and 12B illustrate a horizontal shelf 110 assembled with a foot component 140 and a tee component 150. As shown in the embodiment in FIGS. 12A and 12B, after angled protrusion 122 is inserted into groove 113 and internal receptacle 124 is aligned with external receptacle 114, magnetic fasteners 130 are inserted into external receptacle 114 and internal receptacle 124.

Figure 13:
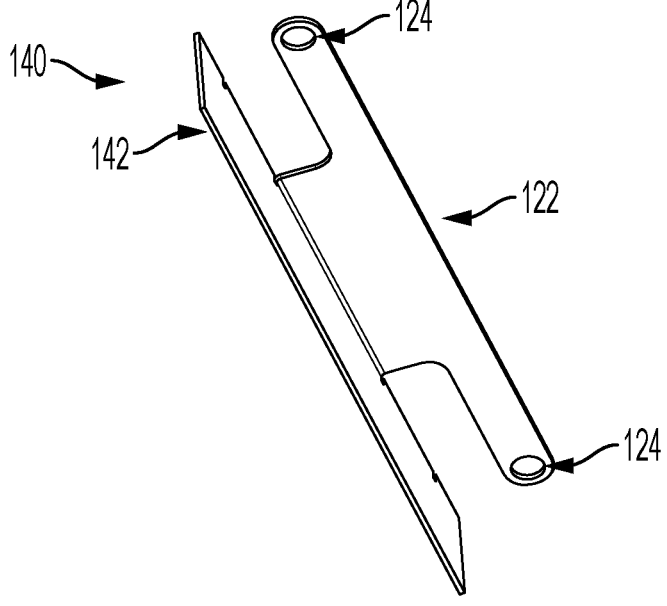
FIG. 13 is a perspective view of a foot component displaying a foot and a protrusion.

As shown in greater detail in FIG. 13, a foot component 140 can include an angled protrusion 122 defining one or more internal receptacles 124 and a foot 142. Accordingly, foot component 140 may be used on the exterior of a shelving unit or storage solution.

Figure 14:
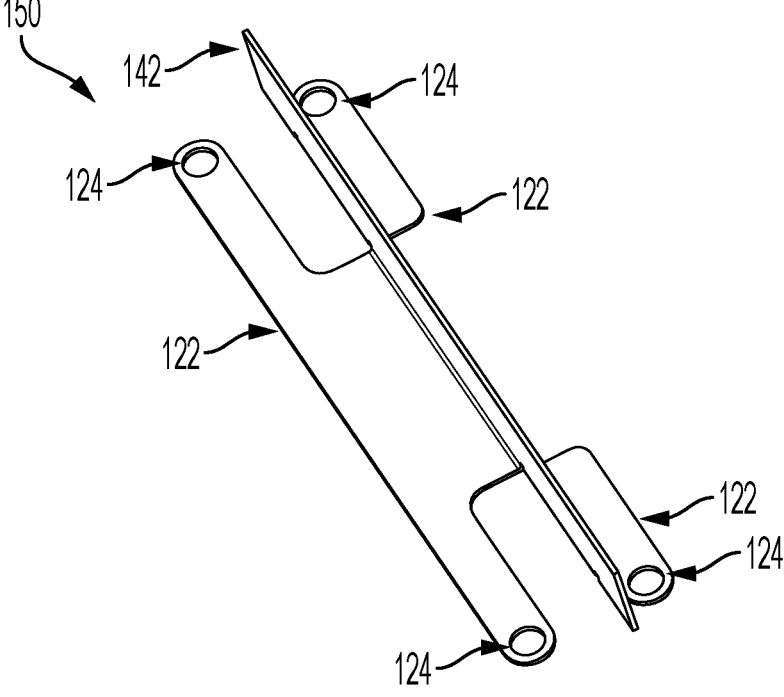
FIG. 14 is a perspective view of a tee component displaying a foot component and multiple protrusions.

As shown in greater detail in FIG. 14, a tee component 150 comprises multiple protrusions on both sides of a foot 142. Accordingly, tee component 150 may be used on the interior of a shelving unit. Tee component 150 may enable multiple magnetic shelf panel joints 100 on both sides of foot 142. For example, a horizontal shelf panel 110 could be connected to protrusions on both sides of foot 142.

Figure 15:
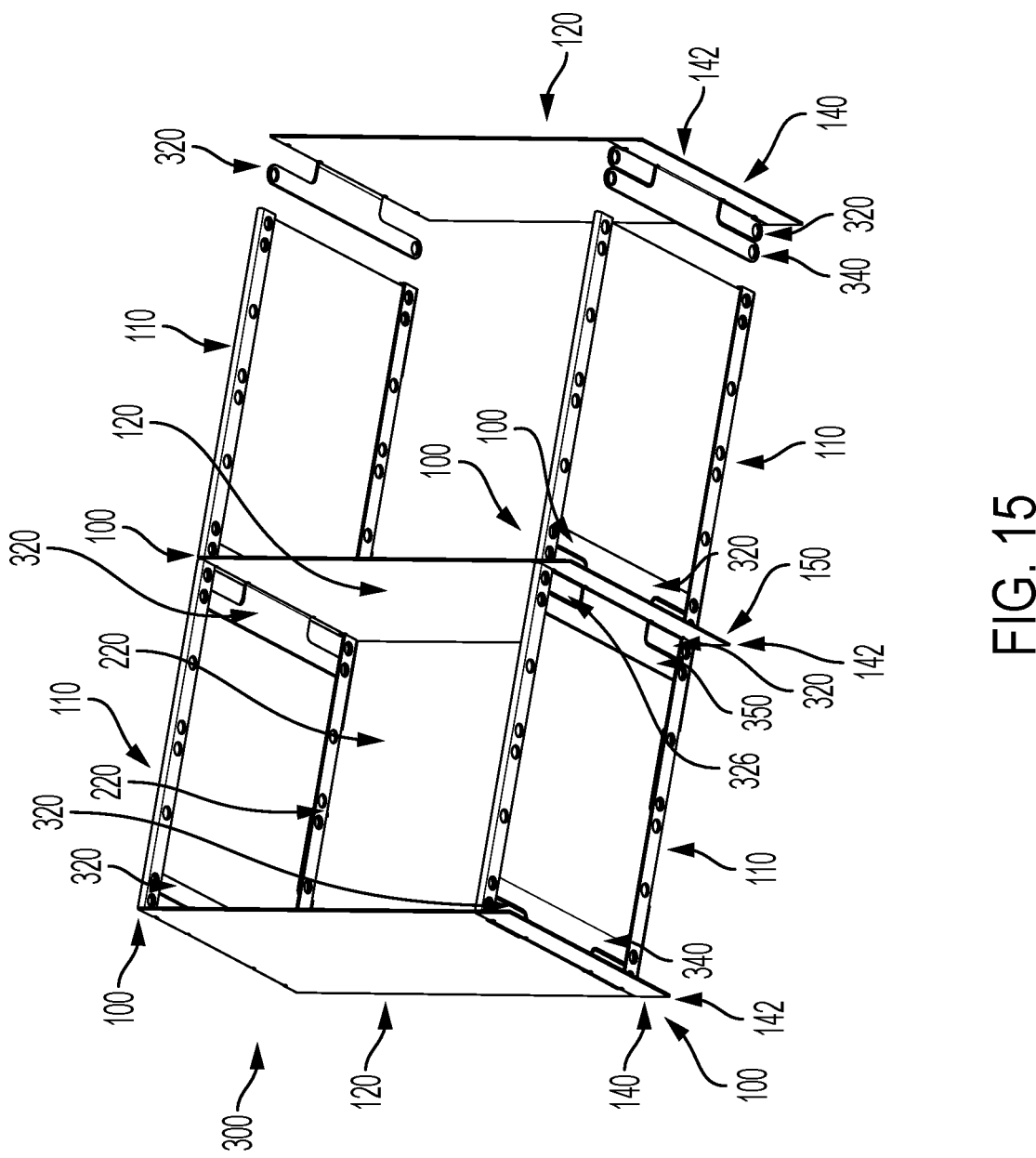
FIG. 15 is a perspective view of a partially assembled one by two shelf assembly in accordance with some embodiments of the present disclosure.
Figure 16:
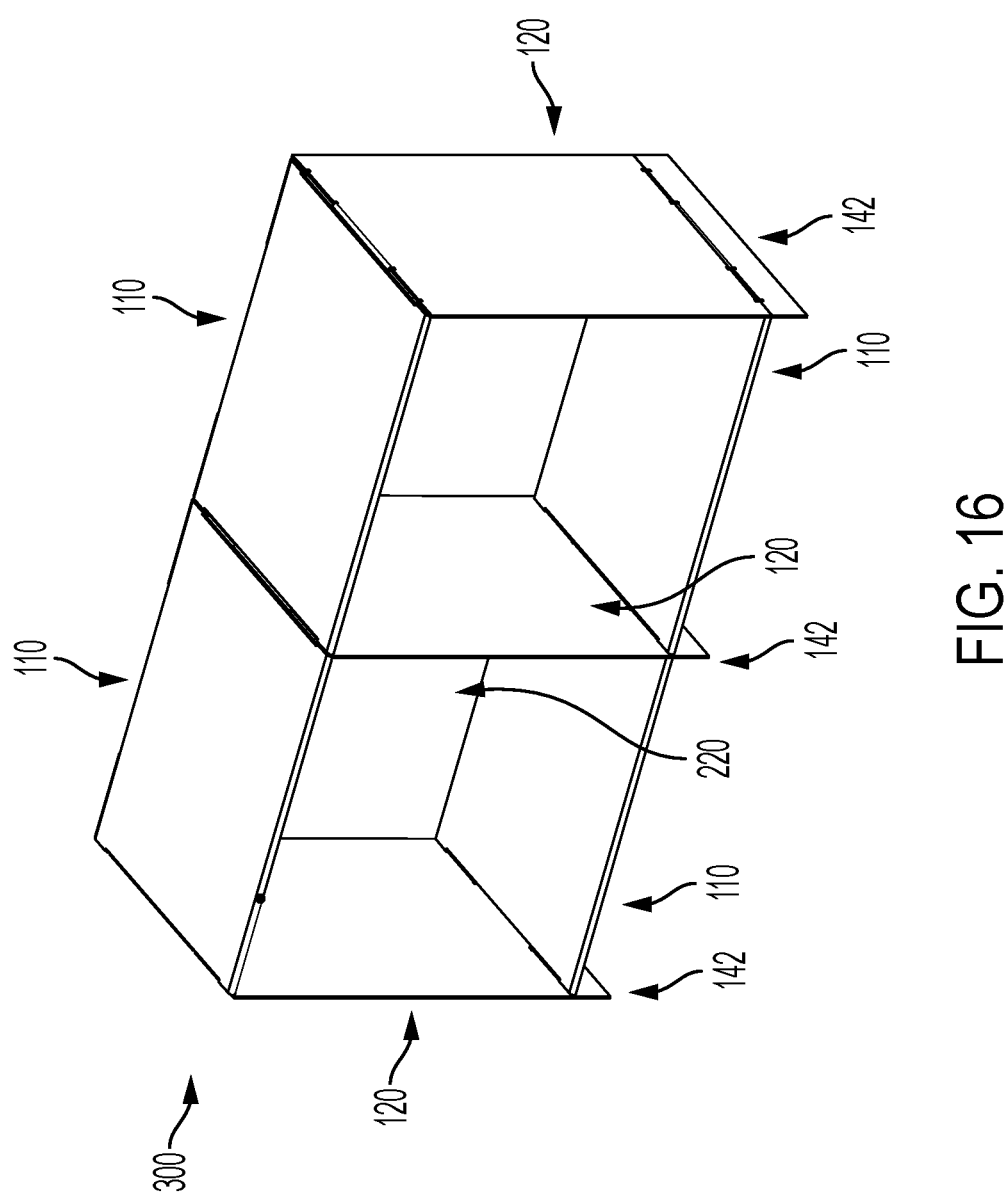
FIG. 16 is a perspective view of an assembled one by two shelf assembly in accordance with some embodiments of the present disclosure.

A storage apparatus 300 comprising multiple magnetic panel joints 100 is generally shown in FIGS. 15 and 16. As shown in the embodiment in FIGS. 15 and 16, four horizontal shelf panels 110 are joined to three vertical side shelf wall panels 120. Multiple protrusions may be inserted into each groove to create an infinite number of storage apparatus configurations. For example, vertical side shelf wall panel protrusions 320 may be stacked with foot component protrusions 340 and inserted into the same groove of horizontal shelf panel 110. Also, vertical side shelf wall panel protrusions 320 may be stacked with tee component protrusions 350 and inserted into the same groove of horizontal shelf panel 110. Certain features of magnetic panel joints 100 of storage apparatus 300 are not discussed in these examples where such features may be similar to those discussed for other embodiments.

Figure 17:
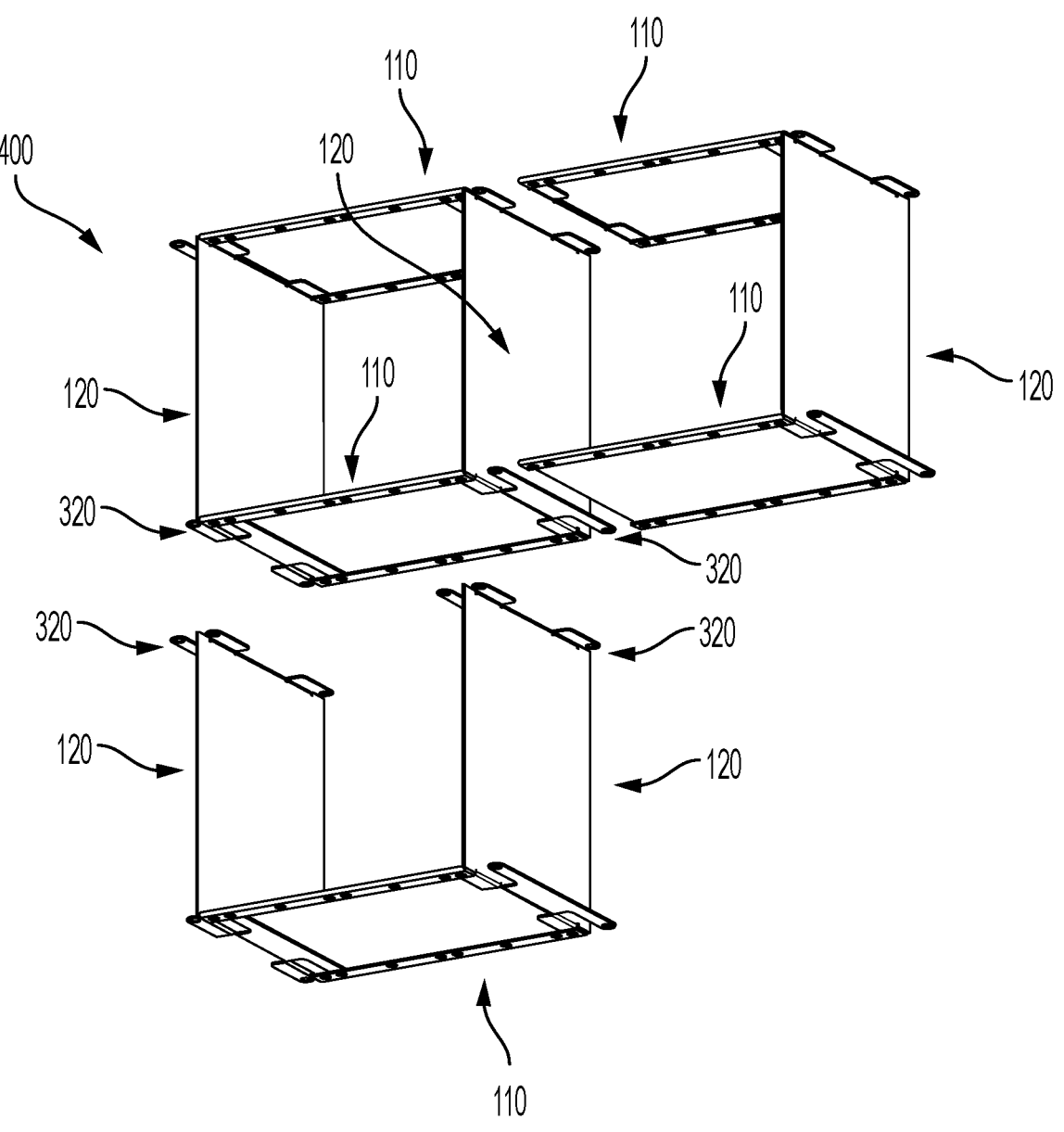
FIG. 17 is an exploded view of multiple magnetic panel joints in accordance with some embodiments of the present disclosure.
Figure 18B:
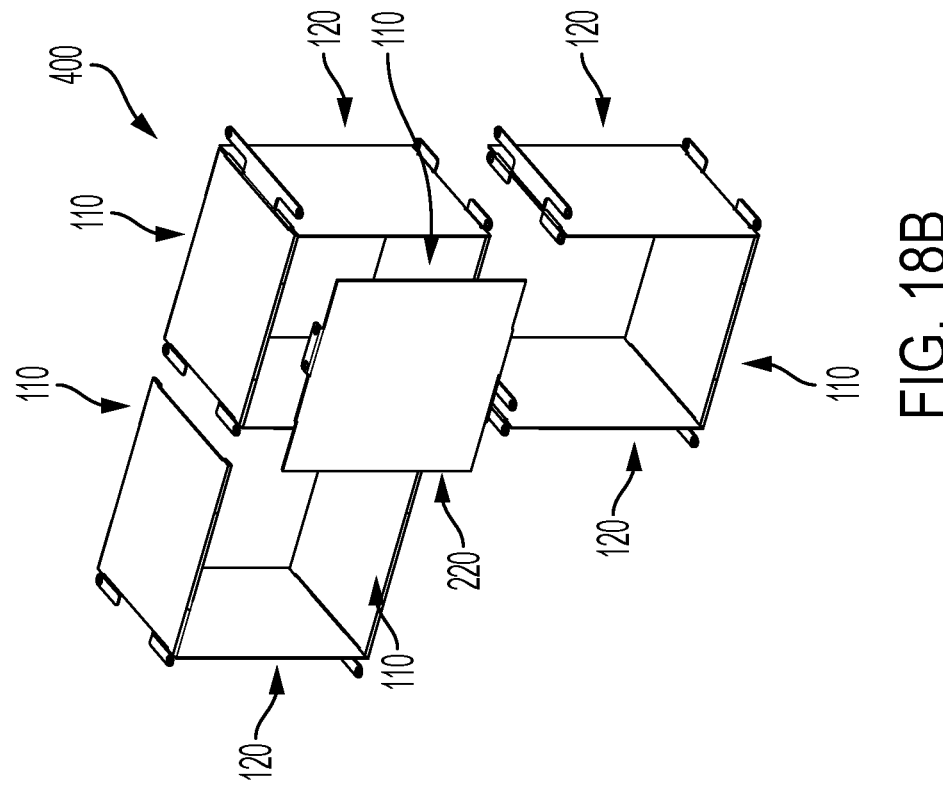
FIG. 18B is an exploded view of multiple magnetic panel joints in accordance with some embodiments of the present disclosure.
Figure 18A:
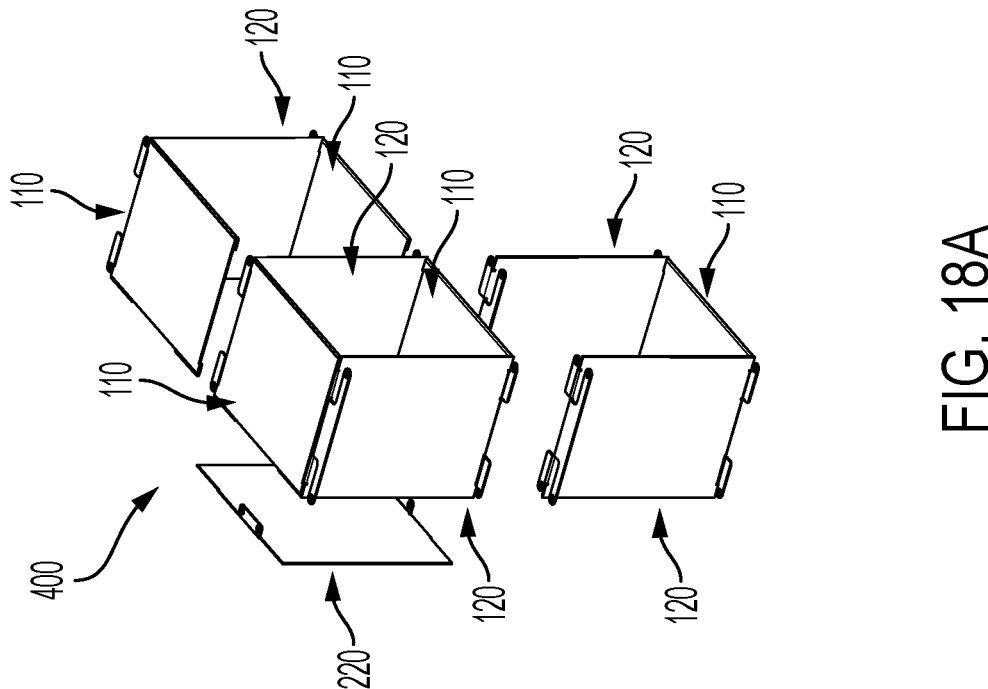
FIG. 18A is an exploded view of multiple magnetic panel joints in accordance with some embodiments of the present disclosure.

An unassembled storage apparatus 400 comprising multiple magnetic panel joints 100 is generally shown in FIGS. 17, 18A and 18B. As shown in the embodiment in FIGS. 17, 18A, and 18B, five horizontal shelf panels 110 are joined to five vertical side shelf wall panels 120. Multiple protrusions may be inserted into each groove to create an infinite number of storage apparatus configurations. For example, vertical side shelf wall panel protrusions 320 may be stacked with other vertical side shelf wall panel protrusions 320 and inserted into the same groove of horizontal shelf panel 110. Additionally, vertical rear shelf wall panels may be joined to horizontal shelf panels 110 simultaneously. Certain features of magnetic panel joints 100 of storage apparatus 400 are not discussed in these examples where such features may be similar to those discussed for other embodiments.

Figure 19:
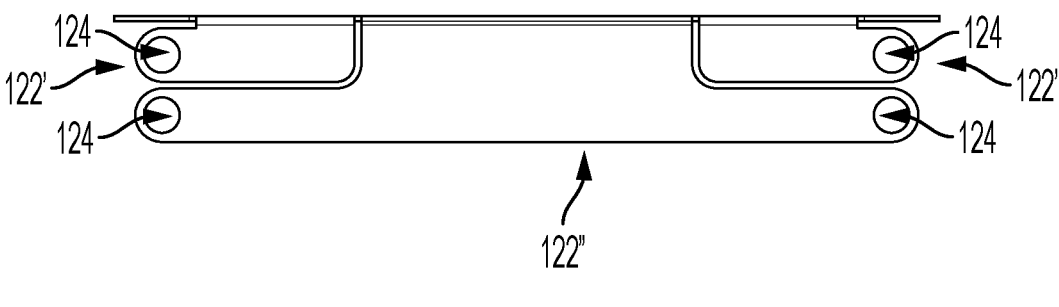
FIG. 19 is a top view of stacked protrusions.

As shown in greater detail in FIG. 19, protrusions of one storage apparatus component 122' can be stacked on protrusions of another storage apparatus component 122". Stacked protrusions may be inserted into a groove 112 or slot 117 of a horizontal shelf panel 110.

Figure 20:
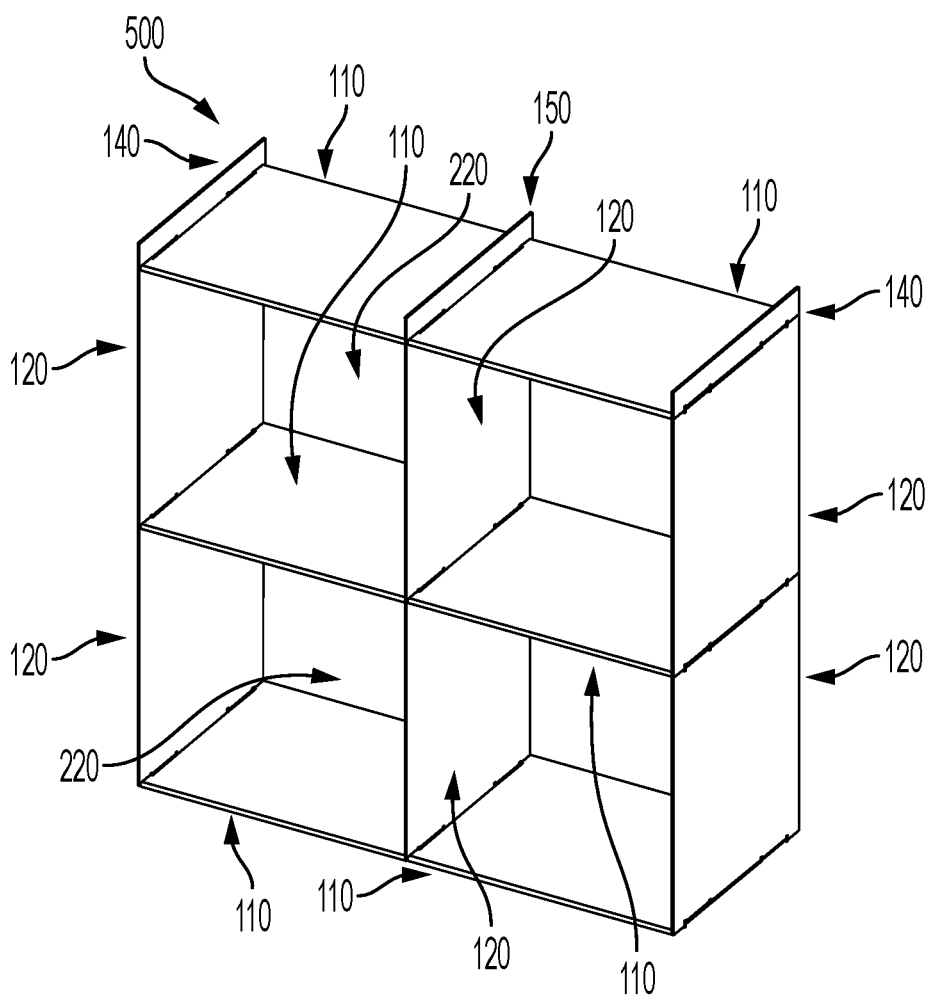
FIG. 20 is a perspective view of a two by two shelf assembly in accordance with some embodiments of the present disclosure.
Figure 21:
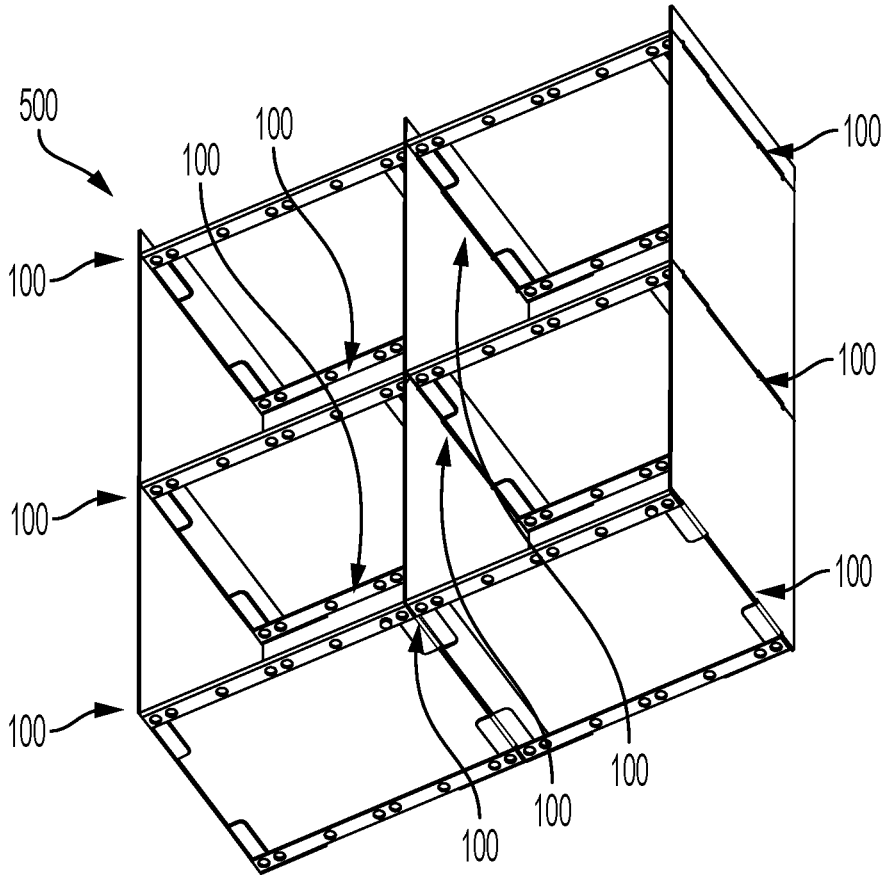
FIG. 21 is a perspective view of a two by two shelf assembly in accordance with some embodiments of the present disclosure.

An assembled storage apparatus 500 comprising multiple magnetic panel joints 100 is generally shown in FIGS. 20 and 21. As shown in the embodiment in FIGS. 20 and 21 six horizontal shelf panels 110 are joined to six vertical side shelf wall panels 120, two foot components 140, and one tee component 150. Additionally, vertical rear shelf wall panels may be joined to horizontal shelf panels 110 simultaneously. Certain features of magnetic panel joints 100 of storage apparatus 500 are not discussed in these examples where such features may be similar to those discussed for other embodiments.

Figures 22A, 22B:
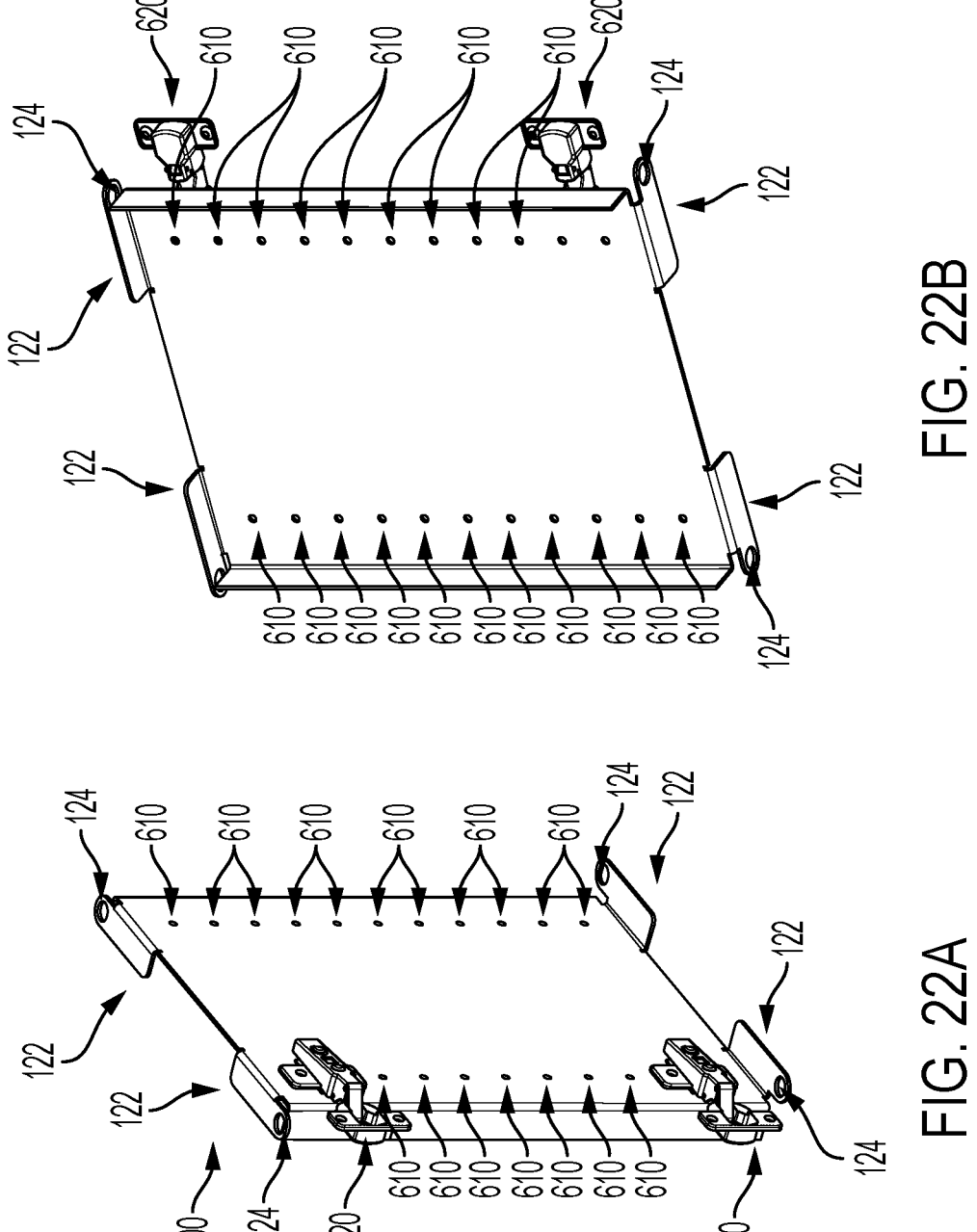
FIG. 22A is a perspective view of a double panel displaying protrusions in accordance with some embodiments of the present disclosure.
FIG. 22B is a perspective view of a double panel displaying cabinet hardware fastener receptacles in accordance with some embodiments of the present disclosure.

FIGS. 22A and 22B illustrate a double panel 600 with multiple cabinet hardware fastener receptacles 610 and cabinet hardware components 620. Cabinet hardware fastener receptacles allow cabinet hardware components 620 such as hinges to mount to double panels via fasteners such as bolts and screws. Double panel 600 has angled protrusions 122 defining internal receptacles 124 to enable compatibility with magnetic panel joints 100. For example, Double panel 600 could be installed on storage apparatus 300, 400, or 500. Certain features of magnetic panel joints 100 are not discussed in these examples where such features may be similar to those discussed for other embodiments.

Figures 23A, 23B:
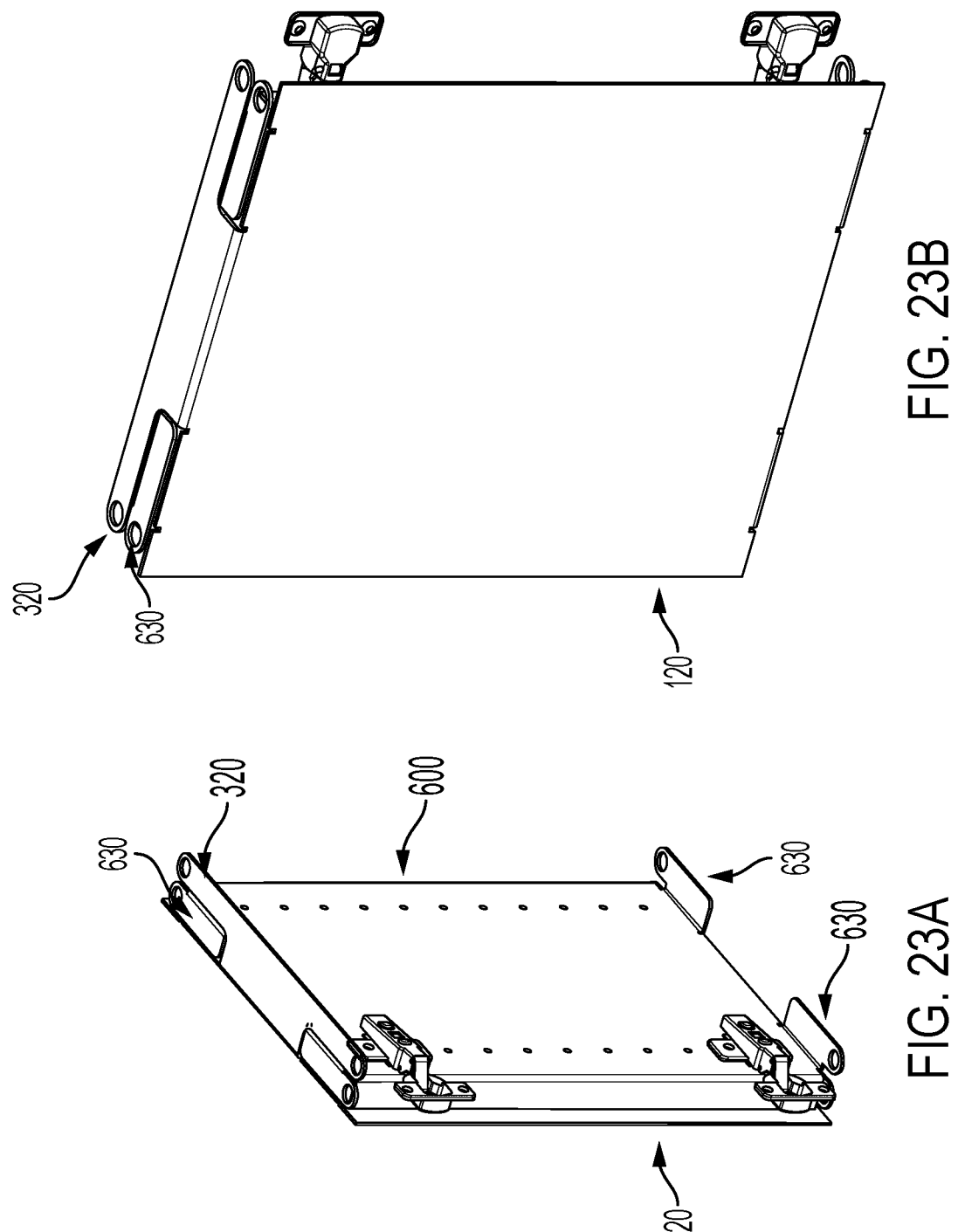
FIG. 23A is a perspective view of a double panel assembly displaying a double panel.
FIG. 23B is a perspective view of a double panel assembly displaying an external vertical shelf wall

A double panel 600 assembled with a vertical side shelf wall panel 120 is generally shown in FIGS. 23A and 23B. As shown in the embodiment in FIGS. 23A and 23B, double panel protrusions 630 can be stacked with vertical side shelf wall panel protrusions 320 and inserted into the same groove 113 or slot 116 of horizontal shelf panel 110.

Figure 24:
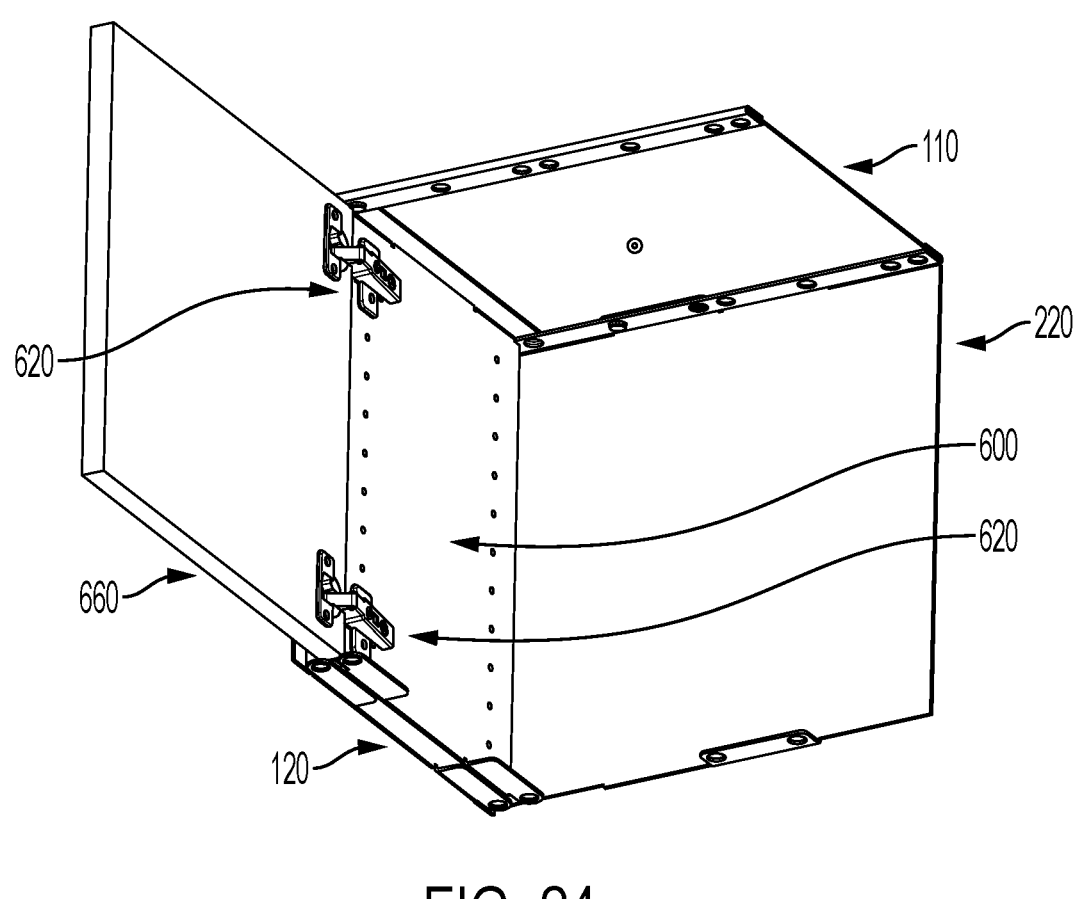
FIG. 24 is a perspective view of a double panel assembly displaying cabinet hardware components and a door.

FIG. 24 illustrates a double panel 600 assembled with a vertical side shelf wall panel 120, a horizontal shelf panel 110, and a vertical rear shelf wall panel 220. Cabinet hardware 620 may be mounted to cabinet hardware fastener receptacles 610. Cabinet hardware 620 may also be coupled to a cabinet door 660.

Figure 25:
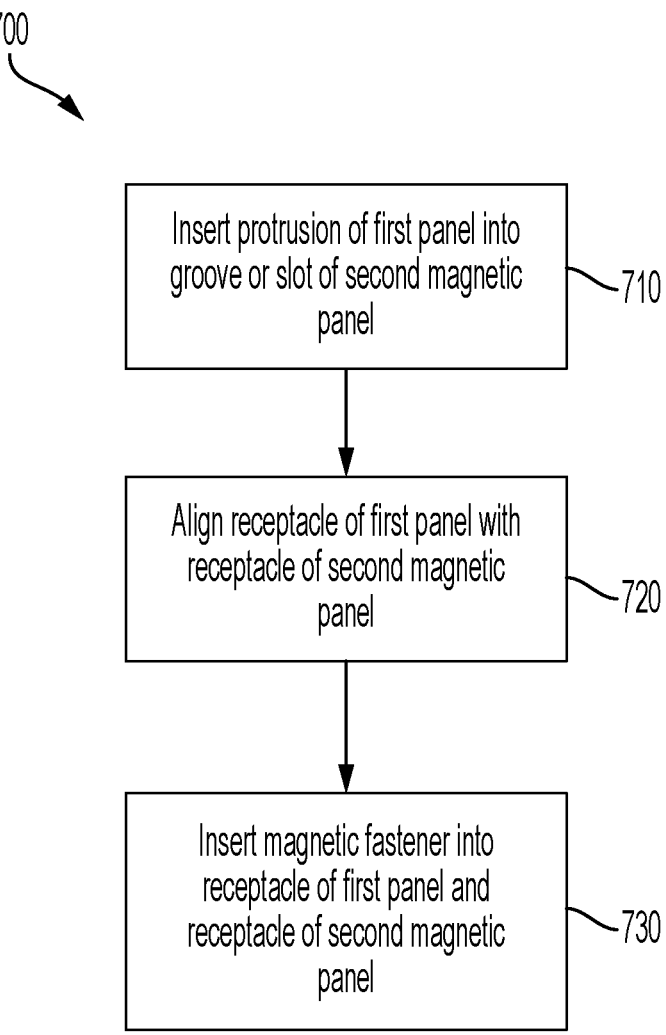
FIG. 25 is a flow diagram of a method of joining two magnetic panels.

FIG. 25 shows diagrammatically method for securing magnetic panels 700 of one embodiment of magnetic shelf panel joint, as also described herein. Method 700 begins with insertion step 710 by inserting the protrusion 122 of a first panel into the groove 113 or slot 117 of a second magnetic panel. After insertion step 710, alignment step 720 occurs wherein an internal receptacle 124 of the first panel is aligned with an external receptacle 114 of the second magnetic panel. After insertion step 720, fastening step 730 occurs in which magnetic fastener 130 is inserted into the external receptacle 114 of the second magnetic panel and the internal receptacle 124 of the first magnetic panel.

In the foregoing specification, embodiments have been described with reference to numerous specific details that can vary from implementation to implementation. Certain adaptations and modifications of the described embodiments can be made. It is also intended that the sequence of steps shown in the figures are only for illustrative purposes and are not intended to be limited to any particular sequence of steps. As such, those skilled in the art can appreciate that these steps can be performed in a different order while implementing the same method.

In the drawings and specification there have been disclosed exemplary embodiments. it will be apparent to those skilled in the art that various modifications and variations can be made to the disclosed apparatuses, systems, and related methods. Other embodiments will be apparent to those skilled in the art from consideration of the specification and practice of the disclosed apparatuses, systems, and related methods. It is intended that the specification and examples be considered as exemplary only, with a true scope being indicated by the following claims and their equivalents.

What is claimed is:

1. A magnetic panel joint comprising:
a first panel oriented in a first plane including an angled protrusion oriented in a second plane different from the first plane, the angled protrusion comprising a first through-hole;
a second magnetic panel including a groove body or slot body defining a groove or slot oriented in the second plane, the groove body or slot body comprising a second through-hole; and
a magnetic fastener;
wherein the angled protrusion is configured to removably engage in the groove or slot to enable alignment of the first through-hole and the second through-hole along a first axis and the magnetic fastener is configured to removably engage in the first through-hole and the second through-hole along the first axis to couple the first panel and the second magnetic panel.

2. The magnetic panel joint of claim 1, wherein the first panel is a vertical wall.

3. The magnetic panel joint of claim 1, wherein the second magnetic panel is a horizontal shelf.

4. The magnetic panel joint of claim 1, wherein the groove body or slot body is a slot body and the groove or slot is a slot; and
wherein the slot body comprises a c-shaped structure, the length of which extends from a first edge of the second magnetic panel towards the center, but not continuously to a second opposite edge of the second magnetic panel.

5. The magnetic panel joint of claim 4, wherein the first panel is a rear wall.

6. The magnetic panel joint of claim 4, wherein the second magnetic panel is a horizontal shelf.

7. The magnetic panel joint of claim 4, wherein the magnetic panel joint is part of a shelving system further comprising a third panel oriented in a third plane including a second angled protrusion oriented in the second plane, wherein the second angled protrusion comprises a third through-hole; and the slot body comprises a second slot and a fourth through-hole; and the shelving system comprises an additional magnetic fastener; and wherein the second angled protrusion is configured to removably engage in the second slot to enable alignment of the third through-hole and the fourth through-hole along a second axis and the additional magnetic fastener is configured to removably engage in the third through-hole and the fourth through-hole along the second axis to couple the second magnetic panel and the third panel.

8. The magnetic panel joint of claim 7, wherein the third panel is a rear wall.

9. The magnetic panel joint of claim 7, wherein the first axis and the second axis are in the same plane as the first plane.

10. The magnetic panel joint of claim 1, wherein the groove body or slot body is a groove body and the groove or slot is a groove; and
wherein the groove body comprises a c-shaped structure, the length of which extends from a first edge of the second magnetic panel to a second opposite edge of the second magnetic panel.

11. The magnetic panel joint of claim 10, wherein the first panel is a side wall.

12. The magnetic panel joint of claim 1, wherein the second plane is offset 90 degrees from the first plane at a right angle.

13. The magnetic panel joint of claim 1, wherein the first axis is in the same plane as the first plane.

14. The magnetic panel joint of claim 1, wherein the first through-hole and the second through-hole have the same cross-sectional area.

15. The magnetic panel joint of claim 1, wherein the first through-hole and the second through-hole are circular and have the same diameter.

16. The magnetic panel joint of claim 1, wherein the angled protrusion comprises two or more first through-holes; the groove body or slot body includes two or more second through-holes; and the magnetic panel joint comprises two or more magnetic fasteners; and
wherein the angled protrusion is configured to removably engage in the groove or slot to enable alignment of the two or more first through-holes with the two or more second through-holes along two more first axes and the two or more magnetic fasteners are configured to removably engage the two or more first through-holes with the at least two more second through-holes along the two or more first axes to couple the first panel and the second magnetic panel.

17. The magnetic panel joint of claim 1, wherein the magnetic fastener is removable and not permanently constrained within either the first panel or the second magnetic panel.

*   *   *   *   *